(12) United States Patent
Zhai et al.

(10) Patent No.: US 11,322,151 B2
(45) Date of Patent: May 3, 2022

(54) METHOD, APPARATUS, AND MEDIUM FOR PROCESSING SPEECH SIGNAL

(71) Applicant: BAIDU ONLINE NETWORK TECHNOLOGY (BEIJING) CO., LTD., Beijing (CN)

(72) Inventors: Chuanlei Zhai, Beijing (CN); Xu Chen, Beijing (CN); Jinfeng Bai, Beijing (CN); Lei Jia, Beijing (CN)

(73) Assignee: BAIDU ONLINE NETWORK TECHNOLOGY (BEIJING) CO., LTD, Beijing (CN)

( * ) Notice: Subject to any disclaimer, the term of this patent is extended or adjusted under 35 U.S.C. 154(b) by 100 days.

(21) Appl. No.: 16/907,936

(22) Filed: Jun. 22, 2020

(65) Prior Publication Data

US 2021/0158823 A1  May 27, 2021

(30) Foreign Application Priority Data

Nov. 21, 2019  (CN) .......................... 201911146748.1

(51) Int. Cl.
G10L 15/00  (2013.01)
G10L 15/26  (2006.01)
G10L 15/02  (2006.01)

(52) U.S. Cl.
CPC .............. *G10L 15/26* (2013.01); *G10L 15/02* (2013.01)

(58) Field of Classification Search
CPC ......... G06F 40/20; G10L 15/01; G10L 15/02; G10L 15/10; G10L 15/16; G10L 15/26
USPC ........................................................ 704/235
See application file for complete search history.

(56) References Cited

U.S. PATENT DOCUMENTS

| | | | | |
|---|---|---|---|---|
| 5,257,314 A | * | 10/1993 | Kimura | G10L 25/87 704/251 |
| 5,689,616 A | * | 11/1997 | Li | G10L 15/005 704/232 |
| 7,676,364 B2 | * | 3/2010 | Rao | G10L 15/08 704/235 |
| 8,234,494 B1 | * | 7/2012 | Bansal | G10L 15/02 713/176 |
| 8,352,261 B2 | * | 1/2013 | Terrell, II | G10L 15/22 704/235 |
| 9,183,830 B2 | * | 11/2015 | Agiomyrgiannakis | G10L 13/02 |
| 9,564,123 B1 | * | 2/2017 | Mont-Reynaud | G10L 15/02 |
| 10,170,134 B2 | * | 1/2019 | Markovich Golan | H04S 7/305 |
| 10,490,204 B2 | * | 11/2019 | Markovich Golan | G10L 21/0208 |
| 10,777,187 B2 | * | 9/2020 | Seki | G10L 15/26 |
| 10,783,903 B2 | * | 9/2020 | Tanaka | G10L 21/0208 |
| 10,923,111 B1 | * | 2/2021 | Fan | G10L 15/10 |

(Continued)

*Primary Examiner* — Khai N. Nguyen
(74) *Attorney, Agent, or Firm* — Fay Sharpe LLP (57) ABSTRACT

According to embodiments of the disclosure, a method and an apparatus for processing a speech signal, and a computer-readable storage medium are provided. The method includes obtaining a set of speech feature representations of a speech signal received. The method also includes generating a set of source text feature representations based on a text recognized from the speech signal, each source text feature representation corresponding to an element in the text. The method also includes generating a set of target text feature representations based on the set of speech feature representations and the set of source text feature representations. The method also includes determining a match degree between the set of target text feature representations and a set of reference text feature representations predefined for the text, the match degree indicating an accuracy of recognizing of the text.

15 Claims, 3 Drawing Sheets

(56) References Cited

U.S. PATENT DOCUMENTS

| | | | | |
|---|---|---|---|---|
| 11,011,160 B1* | 5/2021 | Villaizan | | G10L 15/187 |
| 11,081,109 B2* | 8/2021 | Chae | | G10L 15/22 |
| 2009/0220926 A1* | 9/2009 | Rechlis | | G10L 15/07 |
| | | | | 434/185 |
| 2009/0228274 A1* | 9/2009 | Terrell, II | | G10L 15/22 |
| | | | | 704/235 |
| 2010/0094622 A1* | 4/2010 | Cardillo | | G10L 15/02 |
| | | | | 704/224 |
| 2013/0179167 A1* | 7/2013 | Edgington | | G10L 13/033 |
| | | | | 704/246 |
| 2013/0197908 A1* | 8/2013 | Zhong | | G06F 16/60 |
| | | | | 704/235 |
| 2015/0012275 A1* | 1/2015 | Nonaka | | G10L 15/22 |
| | | | | 704/237 |
| 2015/0127350 A1* | 5/2015 | Agiomyrgiannakis | | |
| | | | | G10L 13/02 |
| | | | | 704/266 |
| 2016/0147765 A1* | 5/2016 | Glover | | G06F 8/00 |
| | | | | 707/723 |
| 2016/0148616 A1* | 5/2016 | Takayanagi | | G10L 15/32 |
| | | | | 704/235 |
| 2017/0032778 A1* | 2/2017 | Kim | | G10L 15/22 |
| 2018/0240471 A1* | 8/2018 | Markovich Golan | | |
| | | | | G10L 21/0232 |
| 2018/0322896 A1* | 11/2018 | Tanaka | | G10L 15/20 |
| 2018/0330716 A1* | 11/2018 | Seki | | G10L 15/22 |
| 2019/0088269 A1* | 3/2019 | Markovich Golan | | |
| | | | | G10L 21/0208 |
| 2019/0221202 A1* | 7/2019 | Li | | G06N 3/0454 |
| 2019/0361900 A1* | 11/2019 | Rogynskyy | | H04L 43/067 |
| 2019/0378509 A1* | 12/2019 | Chae | | G10L 15/26 |
| 2020/0013388 A1* | 1/2020 | Lee | | G10L 13/02 |
| 2020/0022632 A1* | 1/2020 | Lewis | | A61B 5/369 |
| 2020/0023157 A1* | 1/2020 | Lewis | | G06T 3/0068 |
| 2021/0158823 A1* | 5/2021 | Zhai | | G10L 15/10 |
| 2021/0335381 A1* | 10/2021 | Park | | G06N 3/08 |

* cited by examiner

METHOD, APPARATUS, AND MEDIUM FOR PROCESSING SPEECH SIGNAL

CROSS-REFERENCE TO RELATED APPLICATION

This application claims a priority to and benefits of Chinese Patent Application No. 201911146748.1, filed on Nov. 21, 2019, the entire content of which is incorporated herein by reference.

FIELD

Embodiments of the disclosure mainly relate to a field of artificial intelligence, and more particularly to a method, an apparatus, and a computer-readable storage medium for processing a speech signal.

BACKGROUND

A speech interaction technology is a technology that a human interacts with a machine by using speeches, implementing speech interaction experience similar to a natural dialogue. A human-machine interaction ranges from an interaction of a mouse and a keyboard with a screen in the computer era to a direct interaction of a touch screen in the intelligent phone era. A human-machine interaction mode is getting simpler and simpler, and an interaction threshold is getting lower and lower. With the rapid development of artificial intelligence and mobile Internet, a natural speech interaction similar to an interaction between the human and the other human has gradually become a new way of the human-machine interaction. The speech interaction has advantages such as a large input bandwidth, high accuracy, good mobility, and low usage threshold, and is one of preferred interaction modes for the human-machine interaction.

The human-machine interaction is implemented through the speech interaction, thereby improving an information processing efficiency. At the same time, such speech interaction may enable the interaction between a user and the machine easier. However, there are still a plurality of problems to be solved during processing a speech signal.

SUMMARY

In a first aspect of the disclosure, a method for processing a speech signal is provided. The method includes obtaining a set of speech feature representations of a speech signal received. The method also includes generating a set of source text feature representations based on a text recognized from the speech signal, each source text feature representation corresponding to an element in the text. The method also includes generating a set of target text feature representations based on the set of speech feature representations and the set of source text feature representations. The method also includes determining a match degree between the set of target text feature representations and a set of reference text feature representations predefined for the text, the match degree indicating an accuracy of recognizing of the text.

In a second aspect of the disclosure, an apparatus for processing a speech signal is provided. The apparatus includes an obtaining module, configured to obtain a set of speech feature representations of a speech signal received. The apparatus also includes a generating module for a set of source text feature representations, configured to generate the set of source text feature representations based on a text recognized from the speech signal, each source text feature representation corresponding to an element in the text. The apparatus also includes a generating module for a set of target text feature representations, configured to generate the set of target text feature representations based on the set of speech feature representations and the set of source text feature representations. The apparatus also includes a first match degree determining module, configured to determine a match degree between the set of target text feature representations and a set of reference text feature representations predefined for the text, the match degree indicating an accuracy of recognizing of the text.

In a third aspect of the disclosure, a computer-readable storage medium is provided. The computer-readable storage medium has a computer program stored thereon. When the computer program is executed by a processor, the method according to the first aspect of the disclosure is implemented.

It should be understood that, descriptions in Summary of the disclosure are not intended to limit an essential or important feature in embodiments of the disclosure, and are also not construed to limit the scope of the disclosure. Other features of the disclosure will be easily understood by following descriptions.

BRIEF DESCRIPTION OF THE DRAWINGS

The above and other features, advantages and aspects of respective embodiments of the disclosure will become more apparent with reference to accompanying drawings and following detailed illustrations. In the accompanying drawings, the same or similar numeral references represent the same or similar elements, in which.

DETAILED DESCRIPTION

Description will be made in detail below to embodiments of the disclosure with reference to accompanying drawings. Some embodiments of the disclosure are illustrated in the accompanying drawings. However, it should be understood that, the disclosure may be implemented in various ways, and is not limited to the embodiments described herein. On the contrary, those embodiments provided are merely for a more thorough and complete understanding of the disclosure. It should be understood that, the accompanying drawings and embodiments of the disclosure are merely for exemplary purposes, and are not used to limit the protection scope of the disclosure.

In the description of embodiments of the disclosure, terms such as "include" and its equivalents should be understood as an inclusive meaning, i.e. "include but not limited to".

Terms such as "based on" should be understood as "at least partially based on". Terms such as "an embodiment" or "the embodiment" should be understood as "at least one embodiment". Terms such as "first", "second" and the like may represent different or same objects. Other explicit and implicit definitions may also be included below.

An acoustic confidence technology is a technology to measure a credibility of a recognition result of an automatic speech recognition (ASR) system. Through the acoustic confidence technology, it may be distinguished whether an audio corresponding to the recognition result is a speech or a non-speech and whether there is a strict correspondence between a speech and a text. During speech interaction, the ASR system does not have an effective mechanism to distinguish non-speech input such as environmental noise, thus some false recognition occurs. However, the acoustic confidence technology is a secondary confirmation procedure. A score of a confidence is determined for a match degree between the audio and the recognition result, thereby classifying the audio better.

There are generally two solutions for calculating a speech confidence. One solution is a two-class solution based on an audio of a whole sentence. Such solution does not depend on the recognition result of the speech, but extracts features in a form from the audio to classify the audio. However, in a classification solution based on the audio of the whole sentence, a granularity is too large to give detailed information in a unit of the whole sentence. In addition, such solution still may not meet the needs in a calculation result because text information may not be used.

The other solution is an acoustic confidence technology based on an alignment and VGG (visual geometry group) two-level model. Such technology firstly performs an acoustic forced alignment between the audio and the recognition result, thereby determining a segment corresponding to each modeling unit in the recognition result. Then a score is given for the segment through a VGG network, and a match degree between the segment and the modeling unit is judged through the score of the corresponding modeling unit. Finally, it is judged whether the current audio needs to be accepted through a certain decision mode. However, since the acoustic confidence technology based on the alignment and VGG two-level model needs the acoustic forced alignment between the audio and the recognition result, and then scoring for the confidence may be further performed through the VGG model. For such a cascade mode, it is impossible to perform a good joint training for the alignment and the VGG model in a training procedure. In addition, such solution may not make good use of complete information of the audio and the recognition result, and because the audio and the text are in a forced alignment procedure, such solution may not make full use of the audio and text information of the whole sentence.

According to embodiments of the disclosure, an improved solution for speech interaction is provided. In the solution, a set of speech feature representations of a speech signal received is obtained firstly, and a set of source text feature representations corresponding to a text recognized from the speech signal is obtained. A set of target text feature representations may be generated based on the set of speech feature representations and the set of source text feature representations, thereby determining a match degree between the set of target text feature representations and a set of reference text feature representations predefined for the text. Therefore, an accuracy for the text recognized from the speech signal may be determined. With the method, a judgment result of the speech signal may be more accurately, a human-machine interaction is smoother simultaneously, and experience of the human-machine interaction is improved.

Figure 1:
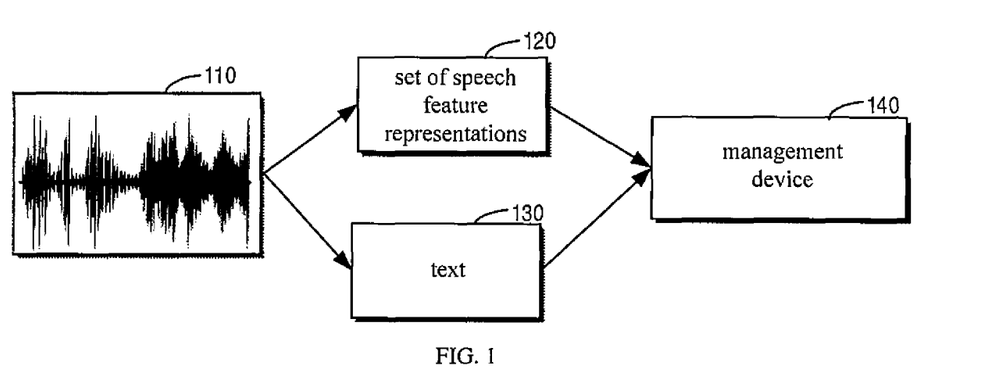
FIG. 1 is a schematic diagram illustrating a scene 100 in which a plurality of embodiments of the disclosure may be implemented.

FIG. 1 is a schematic diagram illustrating a scene 100 in which a plurality of embodiments of the disclosure may be implemented. In the exemplary scene 100, when the human-machine interaction is performed, a speech signal 110 may be obtained. A set 120 of speech feature representations may be obtained from the speech signal 110. In some embodiments, a speech feature representation in the set 120 of speech feature representations represents a speech feature frame, such as an acoustic feature frame. The speech feature frame is a vector obtained from an audio within a predetermined duration.

In FIG. 1, a text 130 is text information obtained from the speech signal 110. For example, the text 130 is obtained by an automatic speech recognition system recognizing the speech signal 110. Alternatively, or additionally, the text 130 may also be generated from the set 120 of speech feature representations by the automatic speech recognition system.

The speech signal 110 may be obtained by any speech interaction device that performs user interaction. In some embodiments, when a user speaks to the speech interaction device, the speech signal 110 may be obtained. In some embodiments, if the speech interaction device exists around the user, the speech interaction device may obtain the speech signal 110 when the user interacts with others. In some embodiments, the speech signal 110 may also be other speech signal received by the speech interaction device, such as a voice from a television. In some embodiments, the speech signal 110 is obtained by the speech interaction device that performs one wake-up multiple interactions. The above examples are only for describing the disclosure and are not detailed limitations to the disclosure.

The speech interaction device may have an associated sound collector (e.g., one or more microphones) to collect a speech command of the user. The speech interaction device may also have an associated sound player (e.g., one or more speakers) to play sound.

The speech interaction device may be any electronic device capable of controlling and/or interacting via the speech signal 110. Some examples of the speech interaction device may include, but be not limited to, a smart sound box, a speech interaction television box, a smart household appliance, a speech home appliance, a smart robot, a map navigation device, a smart wearable device, etc. The speech interaction device may also be any other electronic device installed with a speech interaction application. The speech interaction application may be, such as a speech assistant application, a smart car machine system, an information search application, a map application, a social platform application, an audio and video playing application, a smart assistant application, etc. Examples of the electronic device on which such speech interactive applications may be installed may be, but be not limited to, a smart phone, a multimedia computer, a multimedia tablet, an Internet node, a communicator, a desktop computer, a laptop computer, a notebook computer, a netbook computer, a tablet computer, a personal navigation device, a personal digital assistants (PDA), an audio/video player, a digital camera/vidicon, a pointing device, an electronic book device, a gaming device, or any combination of the foregoing.

In FIG. 1, the set 120 of speech feature representations and the text 130 may be transmitted to a management device 140 for processing. Alternatively, or additionally, the management device 140 may receive the speech signal 110, and then generate the set 120 of speech feature representations and the text 130 based on the speech signal 110.

The management device 140 calculates a confidence level of the text 130 recognized from the speech signal 110 based on the set 120 of speech feature representations, to determine correctness of a recognition result.

In the embodiment illustrated in FIG. 1, the management device 140 may be a computing device located on a network (e.g., cloud), and may directly process the speech signal 110 uploaded by the speech interaction device to obtain the set 120 of speech feature representations and the text 130, thereby performing further processing according to embodiments of the disclosure. In addition, when the speech interaction device uploads the set 120 of speech feature representations and the text 130 to the management device 140, the management device 140 may also directly perform further processing on the set 120 of speech feature representations and the text 130.

In some embodiments, the management device 140 includes, but is not limited to, a personal computer, a server computer, a handheld or laptop device, a mobile device (such as a mobile phone, a personal digital assistant (PDA), a media player, etc.), a multiprocessor system, a consumer electronic product, a minicomputer, a mainframe computer, a distributed computing environment including any of the above systems or devices, etc.

It should be understood that, the scene illustrated in FIG. 1 is exemplary only and is not a detailed limitation for the disclosure. In some embodiments, the management device 140 is not necessarily located at the network, but may be implemented, for example, as the speech interaction device that interacts with the user. In this case, the management device 140 may receive the speech signal 110 from the user and process the speech signal 110 to obtain the set 120 of speech feature representations and the text 130, and then perform further processing on the set 120 of speech feature representations and the text 130.

FIG. 1 illustrates the schematic diagram of the scene 100 in which the plurality of embodiments of the disclosure may be implemented. A flow chart of a method 200 for processing a speech signal according to some embodiments of the disclosure may be described below with reference to FIG. 2. The method 200 may be implemented by the management device 140 in FIG. 1 or any other suitable device.

Figure 2:
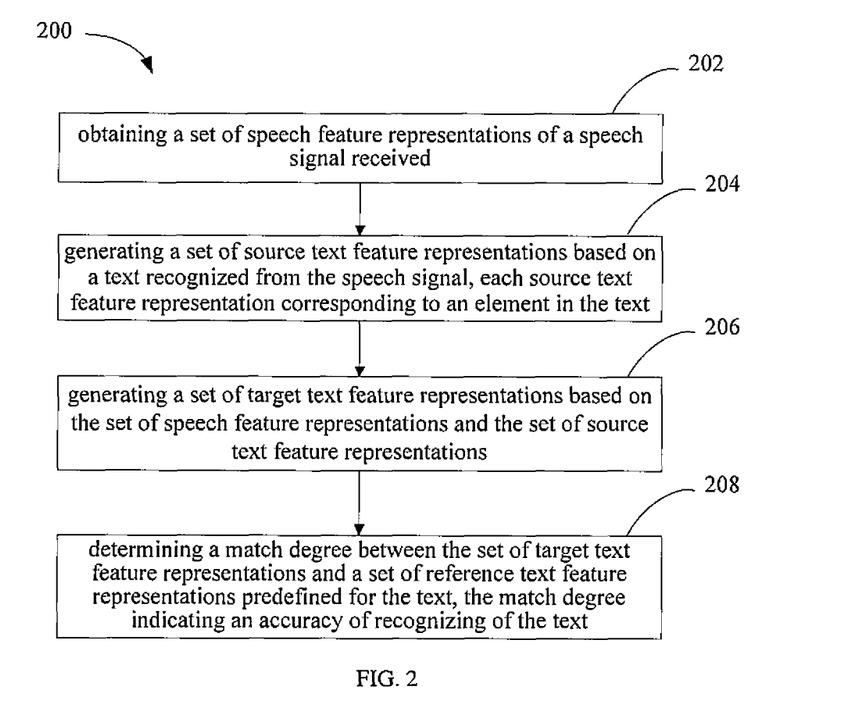
FIG. 2 is a flow chart illustrating a method 200 for processing a speech signal according to some embodiments of the disclosure.

At block 202, the management device 140 obtains the set 120 of speech feature representations of the received speech signal 110. When determining the confidence level of the recognition result of the speech signal 110, the management device 140 needs to obtain the set 120 of speech feature representations of the speech signal 110.

In some embodiments, a speech feature representation in the set 120 of speech feature representations represents a speech feature frame, such as an acoustic feature frame. The speech feature frame is a vector obtained from an audio within a predetermined duration. For example, if a length of the speech signal 110 is 1 second, and one speech feature frame is generated every 10 milliseconds, there may be 100 speech feature frames for the speech signal 110.

In some embodiments, the management device 140 receives the speech signal 110 and generates the set 120 of speech feature representations from the speech signal 110. In some embodiments, the set 120 of speech feature representations is generated by other computing device from the received speech signal 110. The above examples are only for describing the disclosure and are not detailed limitations to the disclosure.

In some embodiments, the management device 140 may perform a non-linear transformation on a speech feature representation in the set 120 of speech feature representations. Then the management device 140 replaces the speech feature representation in the set 120 of speech feature representations with the transformed speech feature representation.

For example, the management device 140 transmits the set 120 of speech feature representations to a confidence model composed of a neural network model for a speech recognition result, and obtains an updated set 120 of speech feature representations by performing non-linear transformation on the set 120 of speech feature representations in the neural network model. In a case where the confidence model for the speech recognition result is an encoder-decoder model, the set 120 of speech feature representations is input into the encoder to generate the updated set 120 of speech feature representations. In detail, for each speech feature representation in the set 120 of speech feature representations, an updated speech feature representation is generated by using the speech feature representation and other speech feature representations in the set 120 of speech feature representations. Then each speech feature representation in the set 120 of speech feature representations is replaced with the each updated speech feature representation.

In some embodiments, an encoder procedure is a bidirectional encoder procedure, including but being not limited to, self-attention, bidirectional LSTM (Long Short-Term Memory), bidirectional GRU (Gate Recurrent Unit), etc.

At block 204, the management device 140 generates a set of source text feature representations based on the text 130 recognized from the speech signal 110. Each source text feature representation corresponds to an element in the text 130.

In some embodiments, the management device 140 directly receives the text 130 recognized from the speech signal 110 from other computing device or speech processing device. In some embodiments, the management device 140 receives the speech signal 110 and recognizes the text 130 from the speech signal 110. In some embodiments, the text 130 is recognized from the speech signal 110 by using an automatic speech recognition system. In some embodiments, the text 130 is determined from the set 120 of speech feature representations. The above examples are only for describing the disclosure, but not detailed limitations to the disclosure.

In some embodiments, the text 130 is sent into the confidence model, formed by the neural network, for the speech recognition result, to be generated. For example, if the confidence model for the speech recognition result is the encoder-decoder model, the text 130 is sent into the decoder to generate the set of source text feature representations corresponding to the text 130. Each source text feature representation corresponds to one element in text 130.

In some embodiments, one element is a character. In some embodiment, one element is a syllable. In some embodiments, an element is a letter. The above examples are only for describing the disclosure and are not detailed limitations to the disclosure. The skilled in the art may set content of the element as required.

In some embodiments, the decoder procedure is also the bidirectional decoder procedure, including but being not limited to, the self-attention, the bidirectional LSTM, the bidirectional GRU, etc. The bidirectional decoder procedure may also be changed into a unidirectional decoder procedure through appropriate processing.

At block 206, the management device 140 generates a set of target text feature representations based on the set 120 of speech feature representations and the set of source text feature representations. A procedure for the management device 140 generating the set of target text feature representations by using the set 120 of speech feature representations and the set of source text feature representations will be described in detail below with reference to FIG. 3.

At block 208, the management device 140 determines a match degree between the set of target text feature representations and a set of reference text feature representations predefined for the text. The match degree indicates an accuracy of recognizing of the text. A procedure for the management device 140 determining the match degree is described in the following example.

In some embodiments, the management device 140 determines a plurality of similarity degrees between a plurality of target text feature representations in the set of target text feature representations and a plurality of reference text feature representations corresponding to the plurality of target text feature representations and in the set of reference text feature representations.

Then, the management device 140 may determine the match degree based on an average value of these similarity degrees. In some embodiments, the management device 140 weights and flattens these similarity degrees to determine the match degree. The above example is only for describing the disclosure and is not detailed limitation to the disclosure. The skilled in the art may determine the match degree from the plurality of similarity degrees in any suitable manner as required.

In some embodiments, after the set of target text feature representations is obtained, the management device 140 continues to determine the similarity degree of each of the plurality of target text feature representations with the reference text feature representation corresponding to each target text feature representation in the operated confidence model for the speech recognition result. In the neural network of the confidence model for the speech recognition result, by inputting the target text feature representation and the corresponding element in the text 130 into the neural network model, the neural network model determines the similarity degree between the target text feature representation and the reference text feature representation based on the reference text feature representation corresponding to the element.

In some embodiments, the management device 140 compares the match degree with a threshold degree. The management device 140 executes an operation indicated by the text 130 when the determined match degree is greater than the threshold degree. If it is determined that the match degree is lower than the threshold degree, the operation indicated in the text 130 may not be executed.

In some embodiments, the confidence model for the speech recognition result (e.g., the encoder-decoder model) determines a similarity degree corresponding to each element in the text 130 based on the input set 120 of speech feature representations and the text 130, thereby obtaining a plurality of similarity degrees. The confidence model for the speech recognition result is trained by model training data. There are two sources of negative cases in training samples. One source is environmental noise data, and a whole sentence of the environmental noise data is taken as a negative example. The other source is a modeling unit (such as an insertion error, a substitution error and a deletion error) that is identified incorrectly in the training sample, which is also taken as the negative sample. A unit identified correctly in the training sample is taken as a positive sample of the confidence model.

Through the above method, for example, the whole sentence audio and the recognition result information may be used for judgment at the same time, such that a speech judgment result may be more accurate, an interaction between a human and a machine may be smoother, and the experience of the human-machine interaction may be improved.

Figure 3:
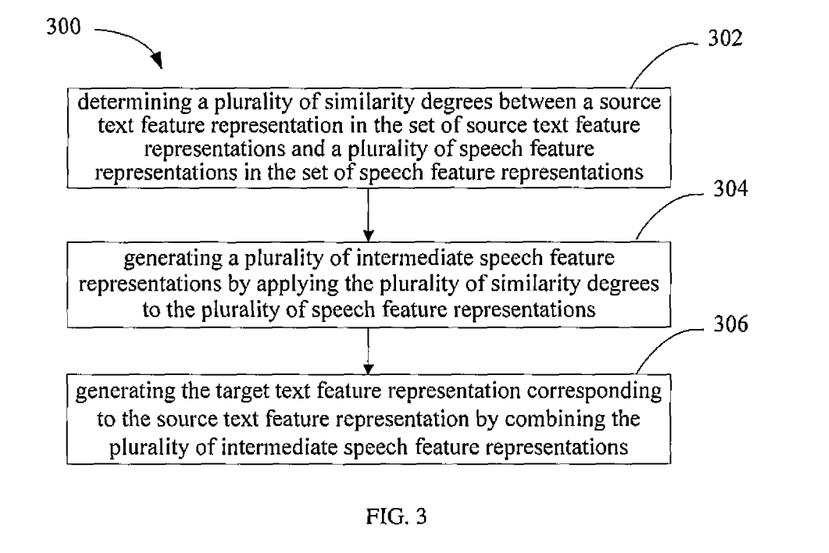
FIG. 3 is a flow chart illustrating a method 300 for generating a set of target text feature representations according to some embodiments of the disclosure.

The flow chart of the method 200 for processing the speech signal according to some embodiments of the disclosure is described above with reference to FIG. 2. A procedure for generating the set of target text feature presentations at block 260 in FIG. 2 will be described below with reference to FIG. 3. FIG. 3 is a flow chart illustrating a method 300 for generating a set of target text feature representations according to some embodiments of the disclosure. The method 300 in FIG. 3 may be performed by the management device 140 in FIG. 1 or any other suitable device.

At block 302, the management device 140 determines a plurality of similarity degrees between a source text feature representation in the set of source text feature representations and a plurality of speech feature representations in the set 120 of speech feature representations.

When the set of target text feature representations is generated, for each source text feature representation in the set of source text feature representations, the management device 140 calculates the similarity degree between this source text feature representation in the set of source text feature representations and each speech feature in the plurality of speech features in the set 120 of speech feature representations. Therefore, the plurality of similarity degrees between each source text feature representation and the plurality of speech feature representations may be determined.

At block 304, the management device 140 generates a plurality of intermediate speech feature representations by applying the plurality of similarity degrees to the plurality of speech feature representations. In some embodiments, the management device 140 uses the plurality of similarity degrees as weights, and applies the weights to speech features corresponding to the plurality of similarity degrees, to generate the plurality of intermediate speech feature representations.

At block 306, the management device 140 generates the target text feature representation corresponding to the source text feature representation by combining the plurality of intermediate speech feature representations. In some embodiments, the management device 140 sums the weighted intermediate speech feature representations to generate the target text feature representation corresponding to the source text feature representation.

In some embodiments, the above procedure may be implemented in the confidence model for the speech recognition result.

With the method, the target text feature representation corresponding to the source text feature representation may be quickly determined, such that the confidence value for the recognition result may be determined as a whole according to the set of speech feature representations, thus the speech command may be executed positively and the user experience is improved.

Figure 4:
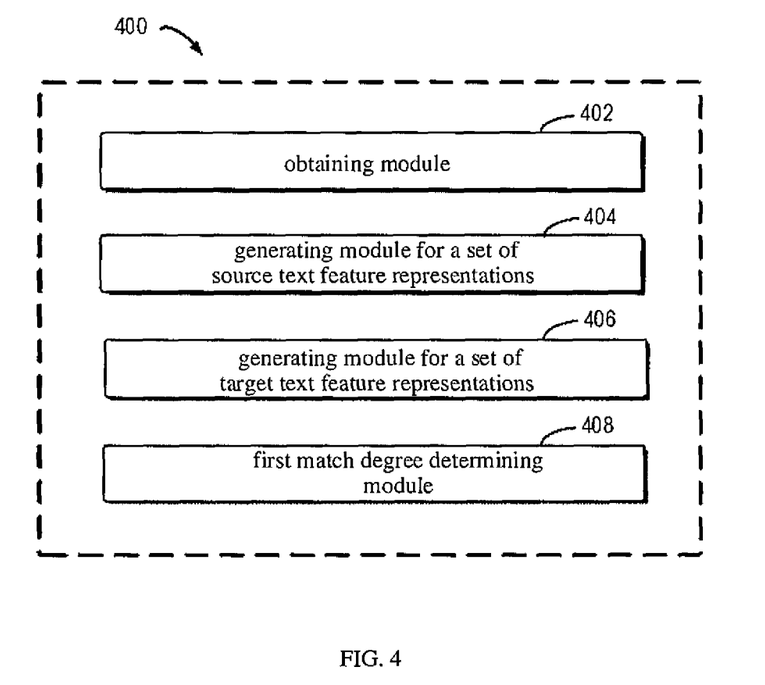
FIG. 4 is a block diagram illustrating an apparatus 400 for processing a speech signal according to some embodiments of the disclosure.

FIG. 4 is a block diagram illustrating an apparatus 400 for processing a speech signal according to some embodiments of the disclosure. As illustrated in FIG. 4, the apparatus 400 may include an obtaining module 402, configured to obtain a set of speech feature representations of a speech signal received. The apparatus 400 also includes a generating module 404 for a set of source text feature representations, configured to generate the set of source text feature representations based on a text recognized from the speech signal, each source text feature representation corresponding to an element in the text. The apparatus 400 also includes a generating module 406 for a set of target text feature representations, configured to generate the set of target text feature representations based on the set of speech feature representations and the set of source text feature representations. The apparatus 400 also includes a first match degree determining module 408, configured to determine a match degree between the set of target text feature representations and a set of reference text feature representations predefined for the text, the match degree indicating an accuracy of recognizing of the text.

In some embodiments, the apparatus 400 also includes a non-linear transformation module and a replacing module. The non-linear transformation module is configured to perform a non-linear transformation on a speech feature representation in the set of speech feature representations. The replacing module is configured to replace the speech feature representation in the set of speech feature representations with the speech feature representation subjected to the non-linear transformation.

In some embodiments, the generating module 406 for the set of target text feature representations, includes: a first determining module for a similarity degree, a generating module for an intermediate speech feature representation, and a combining module. The first determining module for a similarity degree is configured to determine a plurality of similarity degrees between a source text feature representation in the set of source text feature representations and a plurality of speech feature representations in the set of speech feature representations. The generating module for an intermediate speech feature representation is configured to generate a plurality of intermediate speech feature representations by applying the plurality of similarity degrees to the plurality of speech feature representations. The combining module is configured to generate the target text feature representation corresponding to the source text feature representation by combining the plurality of intermediate speech feature representations.

In some embodiments, the first determining module 408 for the match degree, includes: a second determining module for the similarity degree and a second determining module for match degree. The second determining module for the similarity degree is configured to determine a plurality of similarity degrees between a plurality of target text feature representations in the set of target text feature representations and a plurality of reference text feature representations corresponding to the plurality of target text feature representations and in the set of reference text feature representations. The second determining module for match degree is configured to determine the match degree based on an average value of the plurality similarity degrees.

In some embodiments, the apparatus 400 also includes a comparing module and an executing module. The comparing module is configured to compare the match degree with a threshold degree. The executing module is configured to execute an operation indicated by the text in response to determining that the match degree is greater than the threshold degree.

Figure 5:
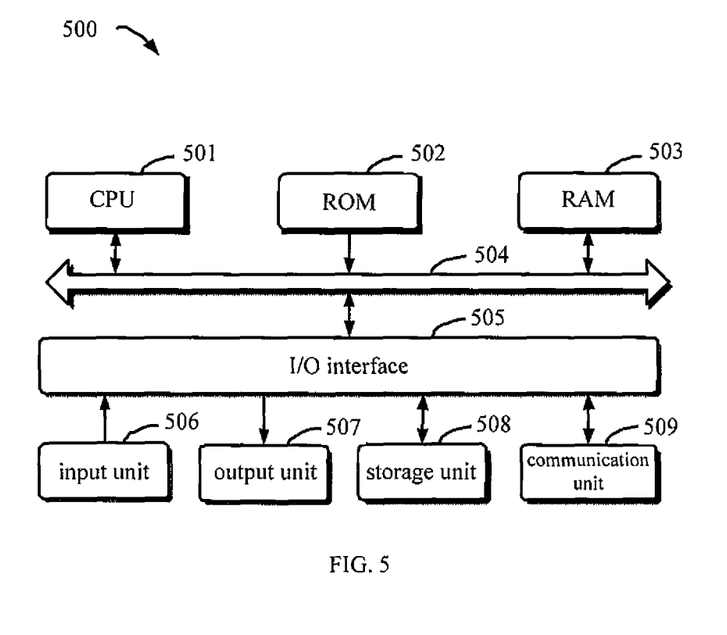
FIG. 5 is a block diagram illustrating a device 500 being capable of implementing a plurality of embodiments of the disclosure.

FIG. 5 is a block diagram illustrating an electronic device 500 for implementing embodiments of the disclosure. The device 500 may be configured as the management device 140 illustrated in FIG. 1. As illustrated in FIG. 5, the device 500 includes a central processing unit (CPU) 501. The CPU 501 may execute various appropriate actions and processes according to computer program instructions stored in a read only memory (ROM) 502 or computer program instructions loaded to a random access memory (RAM) 503 from a storage unit 508. The RAM 503 may also store various programs and date required by the device 500. The CPU 501, the ROM 502, and the RAM 503 may be connected to each other via a bus 504. An input/output (I/O) interface 505 is also connected to the bus 504.

A plurality of components in the device 500 are connected to the I/O interface 505, including: an input unit 506 such as a keyboard, a mouse; an output unit 507 such as various types of displays, loudspeakers; a storage unit 508 such as a magnetic disk, an optical disk; and a communication unit 509, such as a network card, a modem, a wireless communication transceiver. The communication unit 509 allows the device 500 to exchange information/data with other devices over a computer network such as the Internet and/or various telecommunication networks.

The CPU 501 may be various general-purpose and/or special-purpose processing components having processing and computing capabilities. Some examples of the CPU 501 include, but are not limited to, a central processing unit (CPU), a graphics processing unit (GPU), various dedicated artificial intelligence (AI) computing chips, various computing units running machine learning model algorithms, a digital signal processor (DSP), and any suitable processor, controller, microcontroller, etc. The CPU 501 executes the above-mentioned methods and processes, such as the methods 200 and 300. For example, in some embodiments, the methods 200 and 300 may be implemented as a computer software program. The computer software program is tangibly contained a machine readable medium, such as the storage unit 508. In some embodiments, a part or all of the computer programs may be loaded and/or installed on the device 500 through the ROM 502 and/or the communication unit 509. When the computer programs are loaded to the RAM 503 and are executed by the CPU 501, one or more blocks of the methods 200 and 300 described above may be executed. Alternatively, in other embodiments, the CPU 501 may be configured to execute the methods 200 and 300 in other appropriate ways (such as, by means of hardware).

The functions described herein may be executed at least partially by one or more hardware logic components. For example, without not limitation, exemplary types of hardware logic components that may be used include: a field programmable gate array (FPGA), an application specific integrated circuit (ASIC), an application specific standard product (ASSP), a system on chip (SOC), a complex programmable logic device (CPLD) and the like.

Program codes for implementing the method of the disclosure may be written in any combination of one or more programming languages. These program codes may be provided to a processor or a controller of a general-purpose computer, a special purpose computer or other programmable data processing device, such that the functions/operations specified in the flowcharts and/or the block diagrams are implemented when these program codes are executed by the processor or the controller. These program codes may execute entirely on a machine, partly on a machine, partially on the machine as a stand-alone software package and partially on a remote machine or entirely on a remote machine or entirely on a server.

In the context of the disclosure, the machine-readable medium may be a tangible medium that may contain or store a program to be used by or in connection with an instruction execution system, apparatus, or device. The machine-readable medium may be a machine-readable signal medium or a machine-readable storage medium. The machine-readable medium may include, but be not limit to, an electronic, magnetic, optical, electromagnetic, infrared, or semiconductor system, apparatus, or device, or any suitable combination of the foregoing. More specific examples of the machine-readable storage medium may include electrical connections based on one or more wires, a portable computer disk, a hard disk, a RAM, a ROM, an erasable programmable read-only memory (EPROM or flash memory), an optical fiber, a portable compact disk read-only memory (CD-ROM), an optical storage, a magnetic storage device, or any suitable combination of the foregoing.

In addition, although the operations are depicted in a particular order, it should be understood to require that such operations are executed in the particular order illustrated in the drawings or in a sequential order, or that all illustrated operations should be executed to achieve the desired result. Multitasking and parallel processing may be advantageous in certain circumstances. Likewise, although several specific embodiment details are included in the above discussion, these should not be construed as limitation of the scope of the disclosure. Certain features described in the context of separate embodiments may also be implemented in combination in a single implementation. On the contrary, various features described in the context of the single implementation may also be implemented in a plurality of implementations, either individually or in any suitable sub-combination.

Although the subject matter has been described in language specific to structural features and/or methodological acts, it should be understood that the subject matter defined in the appended claims is not limited to the specific features or acts described above. Instead, the specific features and acts described above are merely exemplary forms of implementing the claims.

What is claimed is:

1. A method for processing a speech signal, comprising:
   obtaining a set of speech feature representations of a speech signal received, wherein a speech feature representation in the set of speech feature representations represents a speech feature frame, and the speech feature frame is a vector obtained from an audio within a predetermined duration in the speech signal received;
   generating a set of source text feature representations based on a text recognized from the speech signal, each source text feature representation corresponding to an element in the text, wherein the text is sent into a confidence model, formed by a neural network, for a speech recognition result, so as to generate the set of source text feature representations corresponding to the text, each source text feature representation corresponds to the element in text, the element is a character, a syllable or a letter;
   generating a set of target text feature representations based on the set of speech feature representations and the set of source text feature representations, comprising: determining a plurality of similarity degrees between a source text feature representation in the set of source text feature representations and a plurality of speech feature representations in the set of speech feature representations; generating a plurality of intermediate speech feature representations by applying the plurality of similarity degrees to the plurality of speech feature representations; and generating the target text feature representation corresponding to the source text feature representation by combining the plurality of intermediate speech feature representations; and
   determining a match degree between the set of target text feature representations and a set of reference text feature representations predefined for the text, the match degree indicating an accuracy of recognizing of the text.

2. The method of claim 1, further comprising:
   performing a non-linear transformation on a speech feature representation in the set of speech feature representations; and
   replacing the speech feature representation in the set of speech feature representations with the speech feature representation subjected to the non-linear transformation.

3. The method of claim 1, wherein the plurality of similarity degrees are used as weights, and the weights are applied to the plurality of speech feature representations corresponding to the plurality of similarity degrees, to generate the plurality of intermediate speech feature representations.

4. The method of claim 1, wherein determining the match degree comprises:
   determining a plurality of similarity degrees between a plurality of target text feature representations in the set of target text feature representations and a plurality of reference text feature representations corresponding to the plurality of target text feature representations and in the set of reference text feature representations; and
   determining the match degree based on an average value of the plurality similarity degrees.

5. The method of claim 1, further comprising:
   comparing the match degree with a threshold degree; and
   executing an operation indicated by the text in response to determining that the match degree is greater than the threshold degree.

6. An apparatus for processing a speech signal, comprising:
   a processor; and
   a non-transitory computer readable storage medium storing a plurality of instruction modules that are executed by the processor, the plurality of instruction modules comprising:
   an obtaining module, configured to obtain a set of speech feature representations of a speech signal received, wherein a speech feature representation in the set of speech feature representations represents a speech feature frame, and the speech feature frame is a vector obtained from an audio within a predetermined duration in the speech signal received;
   a generating module for a set of source text feature representations, configured to generate the set of source text feature representations based on a text recognized from the speech signal, each source text feature representation corresponding to an element in the text, wherein the text is sent into a confidence model, formed by a neural network, for a speech recognition result, so as to generate the set of source text feature representations corresponding to the text, each source text feature representation corresponds to the element in text, the element is a character, a syllable or a letter;
   a generating module for a set of target text feature representations, configured to generate the set of target text feature representations based on the set of speech feature representations and the set of source text feature representations, wherein the generating module for the set of target text feature representations, comprises: a first determining module for a similarity degree, configured to determine a plurality of similarity degrees between a source text feature representation in the set of source text feature representations and a plurality of speech feature representations in the set of speech feature representations; a generating module for an intermediate speech feature representation, configured to generate a plurality of intermediate speech feature representations by applying the plurality of similarity degrees to the plurality of speech feature representations; and a combining module, configured to generate the target text feature representation corresponding to the source text feature representation by combining the plurality of intermediate speech feature representations; and a first match degree determining module, configured to determine a match degree between the set of target text feature representations and a set of reference text feature representations predefined for the text, the match degree indicating an accuracy of recognizing of the text.

7. The apparatus of claim 6, the plurality of instruction modules further comprising:
a non-linear transformation module, configured to perform a non-linear transformation on a speech feature representation in the set of speech feature representations; and
a replacing module, configured to replace the speech feature representation in the set of speech feature representations with the speech feature representation subjected to the non-linear transformation.

8. The apparatus of claim 6, wherein the plurality of similarity degrees are used as weights, and the weights are applied to the plurality of speech feature representations corresponding to the plurality of similarity degrees, to generate the plurality of intermediate speech feature representations.

9. The apparatus of claim 6, wherein the first determining module for the match degree, comprises:
a second determining module for the similarity degree, configured to determine a plurality of similarity degrees between a plurality of target text feature representations in the set of target text feature representations and a plurality of reference text feature representations corresponding to the plurality of target text feature representations and in the set of reference text feature representations; and
a second determining module for match degree, configured to determine the match degree based on an average value of the plurality similarity degrees.

10. The apparatus of claim 6, the plurality of instruction modules further comprising:
a comparing module, configured to compare the match degree with a threshold degree; and
an executing module, configured to execute an operation indicated by the text in response to determining that the match degree is greater than the threshold degree.

11. A non-transitory computer-readable storage medium having a computer program stored thereon, wherein a method for processing a speech signal is implemented when the computer program is executed by a processor, the method comprising:
obtaining a set of speech feature representations of a speech signal received, wherein a speech feature representation in the set of speech feature representations represents a speech feature frame, and the speech feature frame is a vector obtained from an audio within a predetermined duration in the speech signal received;
generating a set of source text feature representations based on a text recognized from the speech signal, each source text feature representation corresponding to an element in the text, wherein the text is sent into a confidence model, formed by a neural network, for a speech recognition result, so as to generate the set of source text feature representations corresponding to the text, each source text feature representation corresponds to the element in text, the element is a character, a syllable or a letter;
generating a set of target text feature representations based on the set of speech feature representations and the set of source text feature representations, comprising: determining a plurality of similarity degrees between a source text feature representation in the set of source text feature representations and a plurality of speech feature representations in the set of speech feature re representations; generating a plurality of intermediate speech feature representations by applying the plurality of similarity degrees to the plurality of speech feature representations; and generating the target text feature representation corresponding to the source text feature representation by combining the plurality of intermediate speech feature representations; and
determining a match degree between the set of target text feature representations and a set of reference text feature representations predefined for the text, the match degree indicating an accuracy of recognizing of the text.

12. The non-transitory computer-readable storage medium of claim 11, wherein the method further comprises:
performing a non-linear transformation on a speech feature representation in the set of speech feature representations; and
replacing the speech feature representation in the set of speech feature representations with the speech feature representation subjected to the non-linear transformation.

13. The non-transitory transient computer-readable storage medium of claim 11, wherein the plurality of similarity degrees are used as weights, and the weights are applied to the plurality of speech feature representations corresponding to the plurality of similarity degrees, to generate the plurality of intermediate speech feature representations.

14. The non-transitory computer-readable storage medium of claim 11, wherein determining the match degree comprises:
determining a plurality of similarity degrees between a plurality of target text feature representations in the set of target text feature representations and a plurality of reference text feature representations corresponding to the plurality of target text feature representations and in the set of reference text feature representations; and
determining the match degree based on an average value of the plurality similarity degrees.

15. The non-transitory computer-readable storage medium of claim 11, wherein the method further comprises:
comparing the match degree with a threshold degree; and
executing an operation indicated by the text in response to determining that the match degree is greater than the threshold degree.

* * * * *